(12) United States Patent
Ersoy et al.

(10) Patent No.: US 7,969,654 B1
(45) Date of Patent: Jun. 28, 2011

(54) VOLUME FRESNEL ZONE PLATES FABRICATED BY LASER DIRECT WRITING

(75) Inventors: Okan K. Ersoy, West Lafayette, IN (US); Xianfan Xu, West Lafayette, IN (US); Pornsak Srisungsitthisunti, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 579 days.

(21) Appl. No.: 11/923,415

(22) Filed: Oct. 24, 2007

Related U.S. Application Data (60) Provisional application No. 60/853,960, filed on Oct. 24, 2006, provisional application No. 60/938,053, filed on May 15, 2007.

(51) Int. Cl.
*G02B 27/44* (2006.01)
(52) U.S. Cl. .................................. 359/565; 264/1.37
(58) Field of Classification Search .............. 359/565, 359/566, 742, 15; 264/1.37
See application file for complete search history.

(56) References Cited

U.S. PATENT DOCUMENTS

| | | | | |
|---|---|---|---|---|
| 5,794,023 | A * | 8/1998 | Hobbs et al. | 359/565 |
| 6,707,608 | B1 * | 3/2004 | Arieli et al. | 359/569 |
| 6,884,961 | B1 * | 4/2005 | Dmitriev et al. | 219/121.69 |

OTHER PUBLICATIONS

Tamaki, T. et al., "Structural Modification in Fused Silica by a Femtosecond Fiber Laser at 1558 nm," *Opt. Express* vol. 14, No. 15, Jul. 24, 2006, pp. 6971-6980.
Streltsov, A. M. et al., "Study of Femtosecond-Laser-Written Waveguides in Glasses," *J. Opt. Soc. Am. B*, vol. 19, No. 10, Oct. 1, 2002, pp. 2496-2504.
Osellame, R. et al., "Femtosecond Writing of Active Optical Waveguides With Astigmatically Shaped Beams," *J. Opt. Soc. Am. B*, vol. 20, No. 7., Jul. 1, 2003, pp. 1559-1567 (2003).
Takeshima, N. et al., "Fabrication of High-Efficiency Diffraction Gratings in Glass," *Opt. Lett.*, vol. 30, No. 4, Feb. 15, 2005, pp. 352-354.
Watanabe, W. et al., "Fabrication of Fresnel Zone Plate Embedded in Silica Glass by Femtosecond Laser Pulses," *Opt. Express*, Vo. 10, No. 19, Sep. 23, 2002, pp. 978-983.
Bricchi, E. et al., "Birefringent Fresnel Zone Plates in Silica Fabricated by Femtosecond Laser Machining," *Opt. Lett.*, vol. 27, No. 24, Dec. 15, 2002, pp. 2200-2202.
Yamada, K. et al., "Multilevel Phase-Type Diffractive Lenses in Silica Glass Induced by Filamentation of Femtosecond Laser Pulses," *Opt. Lett.*, vol. 29, No. 16, Aug. 15, 2004, pp. 1846-1848.
Pedrotti, F.L. et al., *Introduction to Optics, 2nd edition*, Prentice Hall, Englewood Cliffs, New Jersey, 1993, title page, copyright page and pp. 374-375.
Ersoy, O., "Construction of Point Images with the Scanning Electron Microscope: A Simple Algorithm," *Optik (Jena)*, vol. 46, No. 1, 1976, pp. 61-66.

(Continued)

*Primary Examiner* — Alessandro Amari
(74) *Attorney, Agent, or Firm* — William F. Bahret (57) ABSTRACT

A volume Fresnel zone plate and a method of producing such a device using a femtosecond laser for direct writing of zone plates. A volume zone plate has a number of Fresnel zone plate layers designed to focus light coherently to a single spot. Embodiments include both low numerical aperture (NA) and high NA zone plates, and provide a significant increase in overall diffraction efficiency over a single Fresnel zone plate.

17 Claims, 6 Drawing Sheets

OTHER PUBLICATIONS

Sun, Q. et al, "Effect of Spherical Aberration on the Propagation of a Tightly Focused Femtosecond Laser Pulse Inside Fused Silica," *J. Opt. A: Pure Appl. Opt.*, vol. 7, No. 11, Nov. 2005, pp. 655-659.

Toma, T. et al., "Estimation of the Refractive Index Change in Glass Induced by Femtosecond Laser Pulses," *Opt. Rev.*, vol. 7, No. 1, Jan./Feb. 2000, pp. 14-17.

* cited by examiner

VOLUME FRESNEL ZONE PLATES FABRICATED BY LASER DIRECT WRITING

CROSS-REFERENCE TO RELATED APPLICATIONS

This application claims the benefit of U.S. Provisional Patent Application Ser. Nos. 60/853,960, filed Oct. 24, 2006, and 60/938,053, filed May 15, 2007, which applications are hereby incorporated by reference along with all references cited therein.

GOVERNMENT RIGHTS

This invention was made with government support under Grant No. 0335074 awarded by the National Science Foundation. The government may have certain rights in the invention.

BACKGROUND OF THE INVENTION

Recently, the use of femtosecond laser direct writing to produce optical devices inside transparent materials has been growing considerably. Tightly focused femtosecond laser pulses can induce nonlinear absorption within the focal volume and permanently modify the index of refraction of the material, as discussed in the following papers: T. Tamaki, W. Watanabe, H. Nagai, M. Yoshida, J. Nishii, and K. Itoh, Opt. Express 14, 6971-6980 (2006); and A. M. Streltsov and N. F. Borrelli, J. Opt. Soc. Am. B 19, 2496-2504 (2002). Although the mechanism responsible for refractive index increase by ultrashort laser pulses is not fully understood, researchers have fabricated various optical devices inside transparent materials with this direct writing method such as waveguides, gratings and diffractive optical elements (DOEs). Examples are discussed in the following papers, which are hereby incorporated by reference along with all other references cited herein:

A. M. Streltsov and N. F. Borrelli, J. Opt. Soc. Am. B 19, 2496-2504 (2002).
R. Osellame, S. Taccheo, M. Mariangoni, R. Ramponi, P. Laporta, D. Polli, S. De Silvestri, and G. Cerullo, J. Opt. Soc. Am. B 20, 1559-1567 (2003).
N. Takeshima, Y. Narita, S. Tanaka, Y. Kuroiwa, and K. Hirao, Opt. Lett. 30, 352-354 (2005).
W. Watanabe, D. Kuroda, K. Itoh, and J. Nishii, Opt. Express 10, 978-983 (2002).
E. Bricchi, J. D. Mills, P. G. Kazansky, B. G. Klappauf, and J. J. Baumberg, Opt. Lett. 27, 2200-2202 (2002).
K. Yamada, W. Watanabe, Y. Li, K. Itoh, and J. Nishii, Opt. Lett. 29, 1846-1848 (2004).

In recent years, the development of fabrication techniques for DOEs has accelerated because DOEs can perform many optical functions like lenses, gratings, optical signal processors, beam splitters, and wavelength (de)multiplexers. Fabrication of DOEs requires high-resolution techniques such as lithography. Femtosecond laser direct writing offers advantages as compared to other techniques such as volume writing, precision, speed, simplicity, and flexibility. In particular, this method of fabrication can be applied for 3D or volume DOEs without difficulties in mask-changing or mask-alignment.

A Fresnel zone plate is one form of a DOE. Fresnel zone plates are attractive because of their compactness and capability for high resolution while maintaining high efficiency. In the absence of losses and absorptions, an ideal diffractive zone plate can offer 100% diffraction efficiency provided that the zone plate correctly modulates phase. In practice, a quantized zone plate is used as an approximation of the perfect diffractive lens and its efficiency ranges from 10% to almost 100% depending on the number of quantization levels. Higher number of phase quantization levels provides higher efficiency, yet increases complication in fabrication. A 2-level Fresnel zone plate having a focal length f is constructed with a series of concentric zones whose radii are defined by $$r_n = \sqrt{n\lambda f + \left(\frac{n\lambda}{2}\right)^2} \approx \sqrt{n\lambda f} \qquad (1)$$

where the integer n indicates the $n^{th}$ Fresnel zone and $\lambda$ is the operating wavelength. The working principle of the Fresnel zone plate relies on the fact that the diffraction of light from alternating zones interferes constructively at the designed focal point. It is required that the alternating zones have different transmission properties (i.e., refractive index), and the incident light is monochromatic.

Studies of direct laser fabrication of Fresnel zone plates inside fused silica have been reported for both amplitude-type zone plates by utilizing scattering damage and phase-type zone plates by refractive index change induced by femtosecond laser pulses. However, all the previously studied zone plates suffered from low diffraction efficiency because of effects such as scattering from damaged regions, phase shift errors due to nonuniform index change inside fused silica, and planar fabrication. Attempts to fabricate multi-level phase zone plates were also reported, yet had difficulty eliminating the phase shift errors due to fabrication. See K. Yamada, W. Watanabe, Y. Li, K. Itoh, and J. Nishii, Opt. Lett. 29, 1846-1848 (2004).

SUMMARY OF THE INVENTION

The present invention provides a method of fabricating a number of Fresnel zone plates or modified Fresnel zone plates within a volume, referred to herein as volume zone plates, to achieve high diffraction efficiency. The volume Fresnel zone plate operates as a single diffractive optical element with a much higher diffraction efficiency than a single zone plate.

Another aspect of the invention involves controlling the laser filament length for uniform zone plate thicknesses in the volume Fresnel zone plate. Phase-type volume zone plates are of primary interest because of their higher efficiency, although the invention is also applicable to amplitude-type zone plates.

The objects and advantages of the present invention will be more apparent upon reading the following detailed description in conjunction with the accompanying drawings.

DESCRIPTION OF PREFERRED EMBODIMENTS

For the purpose of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates.

The present invention provides volume zone plates and related fabrication methods. The concept of a volume Fresnel zone plate is based on the realization that diffracted light from many Fresnel zone plates can be effectively coupled together to enhance the intensity at the focal spot. An incident plane wave is considered for the design. A volume Fresnel zone plate according to a first embodiment of the present invention consists of a number of layers of modified zone plates centered on the same optical axis. A volume modified zone plate should satisfy two conditions: focal point matching and phase matching. First, each Fresnel zone plate inside a volume is designed specifically according to its relative location so that all the zone plates focus light exactly at the same focal point. In addition, the diffracted light from all the zone plates must be "in phase", while the phase at the focal point can be chosen arbitrarily. In other words, the phase shifts produced by every zone plate are the same at the focal point so that the diffracted light from all the zone plates constructively interferes at the focal point.

Figure 1:
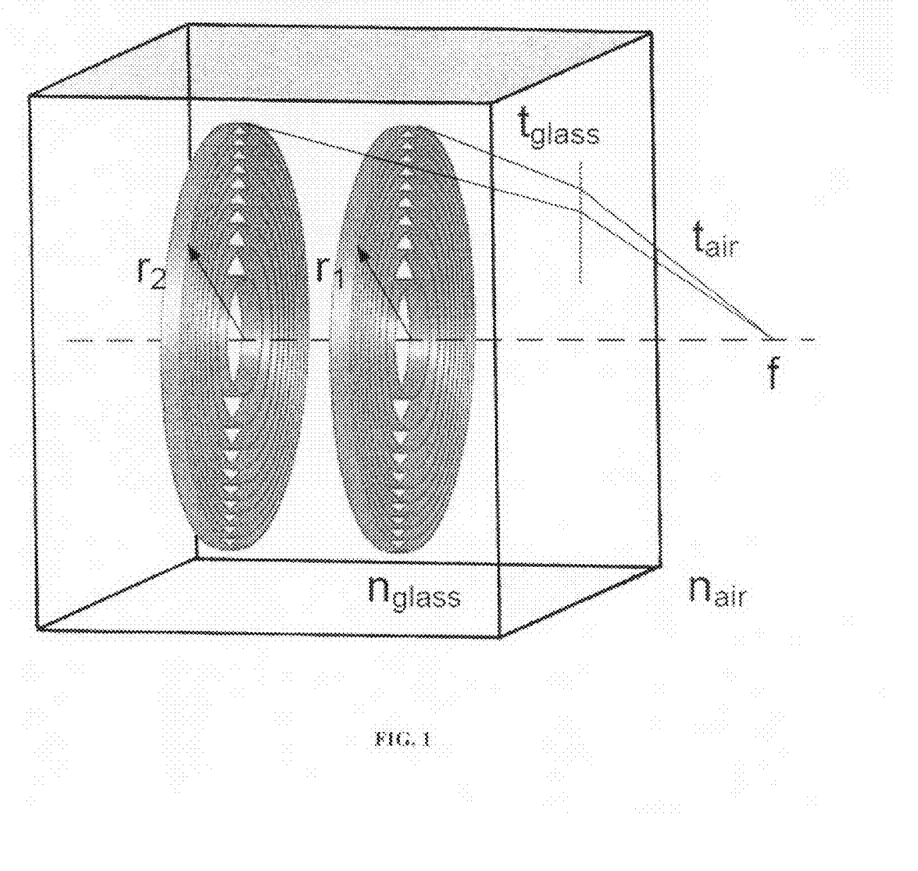
FIG. 1 illustrates the geometry used in phase computation for a volume modified zone plate in accordance with the present invention.

Equation (1) above is valid only when a Fresnel zone plate diffracts light in a medium of constant index of refraction. For an example case, the volume zone plate operated inside a glass substrate whereas the focal point is in air. Therefore, we also took into account the phase shift by the refractive index of the glass and the refraction of light at the air-glass interface. The phase shift due to wave propagation in a homogeneous medium can be calculated as $\phi=2\pi nt/\lambda$, where n is the index of refraction of the medium, and t is the propagation distance. In FIG. 1, the volume zone plate contains two layers of modified Fresnel zone plates, and calculations of phase shift in air and glass are shown.

In the design process, the number of layers in a volume and the spacing between zone plates need to be initially chosen. The spacing between zones is arbitrary but must be greater than the thickness of a zone plate to avoid overlapping of zone plates. Then, the radii of zone plates are generated by applying Eq. (1) with adjusted focal length, $f_i$, according to the axial distance from the focal point. The total optical path length may be calculated by adding the traveling distance in air and glass, considering Snell's angle of refraction. Iteratively, the radii of the zones in each Fresnel zone plate are slightly adjusted to satisfy the phase matching requirement. For example, two zone boundaries ($r_1$ and $r_2$), shown in FIG. 1, are adjusted during the design by using Eqs. (2) and (3) below, such that their phase remainders are equal (b1=b2) at the end of the numerical iterations:

$$\phi_1 = \phi_{air,1} + \phi_{glass,1} = \frac{2\pi}{\lambda}(t_{air,1} + n_{glass,1}t_{glass,1}) = \frac{2\pi}{\lambda}m_1 + b_1 \quad (2)$$

$$\phi_2 = \phi_{air,2} + \phi_{glass,2} = \frac{2\pi}{\lambda}(t_{air,2} + n_{glass,2}t_{glass,2}) = \frac{2\pi}{\lambda}m_2 + b_2 \quad (3)$$

Once all the modified zones have the same phase shift at the focal point, the volume modified Fresnel zone plate reaches the highest diffraction efficiency.

Figure 2:
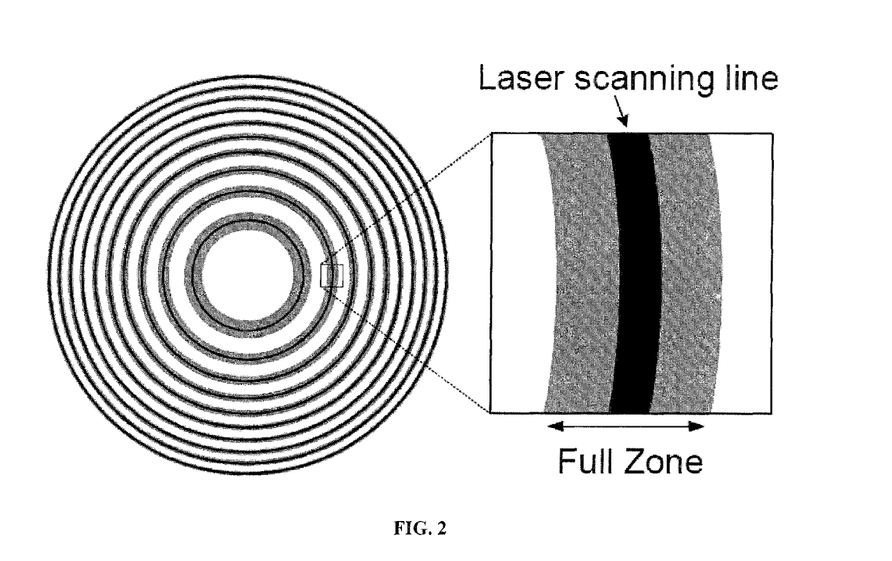
FIG. 2 shows (a) a "full" Fresnel zone plate showing central rings in the middle of each zone and (b) a modified zone plate with central rings the thickness of which is determined by laser writing.
Figure 3:
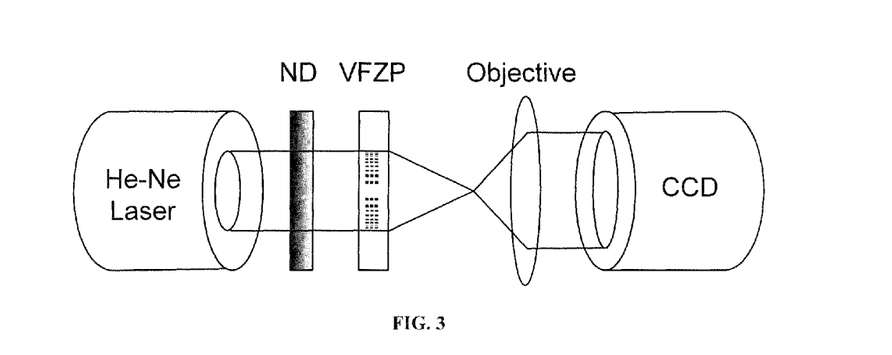
FIG. 3 is a diagram of an experimental setup for efficiency measurements.

For ease of fabrication with minimum phase errors, another modification of the Fresnel zone plate is to fabricate the central rings only instead of full zones. In this modification, each complete zone is replaced by a single central ring in the middle of the zone, as shown in FIG. 2. With this approach, several advantages are achieved. Implementation time is greatly reduced. Since the central circle of each ring corresponds to the exact phase desired, the method is robust against small implementation errors. Hence, the advantages of central rings replacing full zones are especially amplified in the implementation of volume zone plates. In addition, the full zone is not suitable for line by line scanning because the refractive index change is not uniform within the irradiated region such that it is difficult to create a uniform index change across the full zone.

According to the above concept and modifications, the volume zone plate should coherently focus light at the single spot with minimum phase mismatching. By assuming each zone plate has low efficiency, the light diffracted from each modified Fresnel zone plate could be considered to be a small percentage of the total beam. The rest of the main beam transmits and is diffracted by the next layers. As the number of layers increases, the coherent interaction between the zone plates allows the diffraction efficiency to increase.

First Set of Embodiments

A fused silica sample with optically polished surfaces was placed on a computer-controlled x-y-z air bearing stage which had a translational accuracy of 200 nm. The sample was irradiated by 90-fs pulses delivered by a Ti:sapphire amplified laser system at a center wavelength of 800 nm, and 1 kHz repetition rate. The laser beam was attenuated by a polarizer before being focused inside the bulk of fused silica using either 5× (NA 0.15) or 50× (NA 0.80) objective lens. An electronic shutter was connected to the computer controller, allowing the laser exposure and the stage movement to be synchronized together. The fabricated volume Fresnel zone plate had the primary focal length of 20 mm at the wavelength of the He—Ne laser (632.8 nm). Each modified Fresnel zone plate consisted of 20 zones with a total diameter of 1 mm. Further details regarding the use of femtosecond laser pulses for the production of DOEs may be found in U.S. Pat. No. 6,884,961, which is hereby incorporated by reference along with all references cited therein.

A first study was to fabricate single-layer Fresnel zone plates and to characterize the effects of pulse energy and writing speed. Phase zone plates were fabricated by utilizing the change of the index of refraction induced in the medium by the femtosecond laser beam. Using the 5× objective lens, the phase zone plates were fabricated at a writing speed of 10 µm/s and pulse energy of 7-14 µJ. When using such a low numerical aperture lens, the change of the index of refraction was induced over a long length which is determined by the Rayleigh range. Experimentally, the femtosecond laser beam was focused by the 5× objective lens, and induced a 100-um long filament of refractive index change. The maximum increase of index of refraction caused by the femtosecond laser irradiation was in the order of $10^{-3}$. Thus, a π phase shift, which is required for a phase zone plate, could be achieved when the length of the modified region reaches $t=\lambda/2\Delta n=300$ µm. To obtain a π phase shift in this case, it was necessary to increase the refractive index change or extend its length to approximately 300 µm. The latter is more feasible but very time consuming. For a single layer phase zone plate, the fabrication time is estimated to be 18 hrs.

To reduce the fabrication time as well as other reasons discussed above, the phase zone plates were further modified by replacing each "full" zone with a single central ring in the middle of the zone as shown in FIG. 2. The width of each ring was determined by laser writing conditions; the line width of the refractive index change was 2 µm. With this approach, the fabrication time of a modified phase zone plate was reduced to 1 hour.

Single layer amplitude zone plates were fabricated using much higher pulse intensity to create scattering damage spots. Scattering damage caused by optical breakdown occurred when using 50× objective lens. In this study, a high pulse energy of 10-30 µJ was used to fabricate amplitude zone plates with a writing speed of 0.5 mm/s. The fabrication of an amplitude Fresnel zone plate took 15 minutes. When the full Fresnel zone plate was approximated by the modified zone plate with central rings, the fabrication time of amplitude zone plate was reduced to 1 minute.

After the characterization of the single layer zone plates, the volume Fresnel zone plates were fabricated for both amplitude-type and phase-type, with and without central rings used. The volume zone plates were fabricated layer by layer starting from the most bottom layer. Each layer was carefully designed and placed to assure that all layers would focus light together with constructive interference. The separation distance between the layers was of the order of 100 µm, and the zone plates were fabricated approximately 500 um beneath the silica surface.

Figure 4:
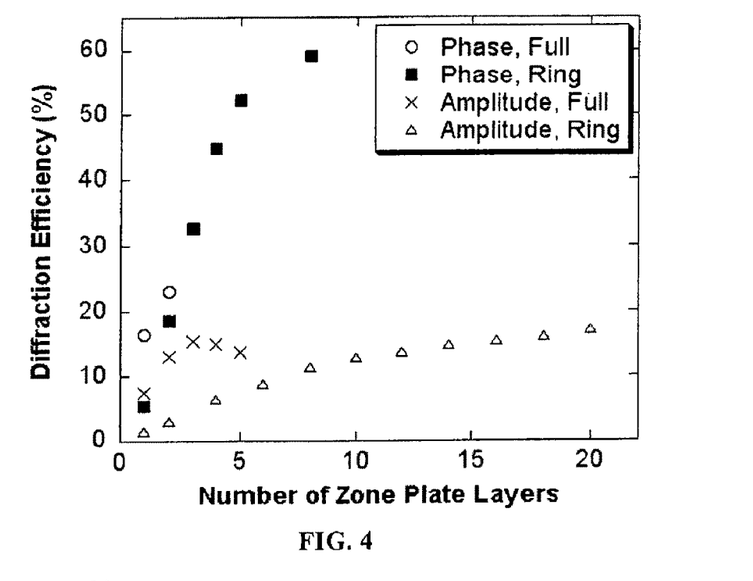
FIG. 4 is a plot of diffraction efficiency as a function of the number of modified phase and amplitude zone plates in a volume.

We measured the diffraction efficiency of the volume Fresnel zone plates implemented with a He—Ne laser at a wavelength of 632.8 nm. The diffracting efficiency of each zone plate was calculated as the ratio of the intensity of diffracted light at the focus point to the intensity of light incident on to the zone plate. The experimental setup for the efficiency measurements is shown in FIG. 4.

The He—Ne laser beam was attenuated by a natural density filter (ND) and focused by the Fresnel zone plate. The diffracted beam at the focal point was first imaged by a 10× objective lens, and then imaged on to a charge-coupled device (CCD) camera. The CCD camera was connected to a frame grabber which converted the analog intensity input into a digital output, which was analyzed by the BeamView Analyzer software (Coherent, Inc.). Alternatively, diffraction efficiency may be measured directly by using a low-power detector with sensitivity up to pW ($10^{-12}$ W). Pinholes with different sizes may be placed in front of the detector to selectively block unwanted light when measuring the light intensity at the focal point.

Figure 5:
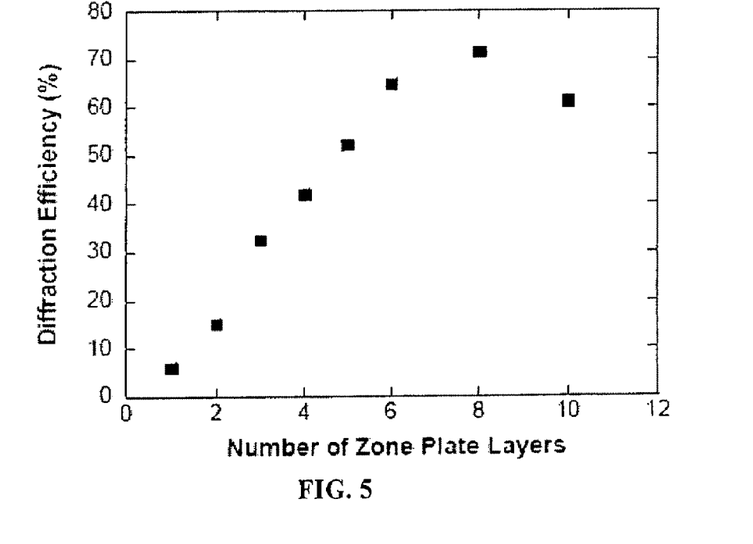
FIG. 5 is a plot of diffraction efficiency as a function of the number of modified phase zone plates in a volume.

The single layer phase zone plates showed maximum efficiencies of 16.4% for a full zone and 5.3% for a central ring zone plate. This low efficiency was due to the small change of the index of refraction which was insufficient to induce a π-phase shift. By adding more layers to build a volume phase zone plate, the efficiency of a volume zone plate with central rings was improved to 59.1% with eight layers of phase zone plates. FIG. 5 shows the measured efficiencies of volume modified Fresnel zone plates as a function of the number of layers of modified zone plates.

The fabricated single layer amplitude zone plates had the efficiency of 7.5% for a full amplitude zone plate, and 1.5% for an amplitude zone plate with central rings. The volume amplitude zone plate reached a maximum efficiency of 15.4% with three layers, and further adding more layers caused efficiency decrease. With volume modified amplitude zone plates based on central rings, the efficiency reached 17.0% with 20 layers, which was the maximum number of layers fabricated.

In characterization tests, the efficiencies of the modified zone plates with central rings increased with a decreasing writing speed or an increasing laser beam energy. At low writing speed, more energy was deposited within a spot, producing higher damage level, which provided better light absorption. The amplitude zone plates perform well when light is absorbed fully at the opaque zones. On the other hand, the optimal performance of single phase zone plates depends on the achievement of π phase shift. The efficiencies of the single phase zone plates implemented increased as the sample was moved slower to induce higher refractive index change.

Also measured was the transmission of total light passing through volume zone plates. It was found that the transmitted light of phase volume zone plates were constant, whereas the transmitted light of amplitude volume zone plates decreased as more zone plates were added. This is a factor which reduces the diffraction efficiency of the volume amplitude zone plates.

The volume Fresnel zone plates effectively improved the diffraction efficiency of phase zone plates and amplitude zone plates. The volume modified phase zone plates had a significant increase in efficiency as more layers were generated. The efficiencies of the full amplitude zone plates reached a maximum and dropped off, indicating that added zone plates could lead to an efficiency reduction. The efficiency drop is probably due to the increased attenuation of light passing through the volume zone plate. On the other hand, the modified amplitude zone plates with central rings did not reach their maximum efficiencies with 20 layers, perhaps because there is less attenuation of the main beam passing through layers of zone plates. In general, the results confirmed that all the modified zone plates worked in coherence together, as a result of using the design of modified zone plates discussed above.

Second Set of Embodiments

For a second set of embodiments, as with others described above, a fused silica sample optically polished on all surfaces was fixed on a computer-controlled x-y-z air bearing stage which has a translational accuracy of 200 nm. The sample was irradiated by 90 fs pulses delivered by a Ti:sapphire amplified laser system at a central wavelength of 800 nm and 1 kHz repetition rate. The laser beam was attenuated before being focused inside the bulk of fused silica. An electronic shutter was connected to the computer controller, allowing the laser exposure and the stage movement to be synchronized. The fabrication process was monitored in real time via a CCD camera imaging on a TV screen.

In femtosecond laser direct writing, both the change in index of refraction and the shape of the filament where change of index of refraction occurs are sensitive to laser processing parameters such as laser frequency, pulse energy, scanning speed, focusing conditions and focusing depth from the surface. For volume Fresnel zone plate fabrication, the processing parameters need to be adjusted when fabricating different layers because the focusing depth has influence on the change in the index of refraction caused by spherical aberration. Spherical aberration generates focal dispersion along optical axis causing nonlinear interaction region elongated toward the laser propagating direction. At the same laser writing condition, experiments showed that the length of region with index change was relatively longer at the deeper position from the surface depending on the focusing condition. For example, using 5× objective lens (NA=0.15), the filament length was 100 μm at 0.5 mm below the surface compared to filament length of 250 μM at 2 mm below the surface. This discrepancy in length was undesirable for volume zone plate because we need consistent thickness of each zone plate to determine the influence of the number of layers used in the volume zone plate. To obtain a constant filament length for all layers, a different laser energy was applied for a different depth of fabrication. The laser energy and writing conditions required for specific depth were experimentally predetermined for the above reasons.

5× and 100× objective lenses were used to fabricate low and high numerical aperture (NA) volume zone plates, respectively. An estimation of refractive index changes due to femtosecond pulses focused by 5× and 100× lenses is necessary to correctly predict the phase shift by fabricated volume zone plates. Usually, the refractive index change due to femtosecond laser pulses is not uniform along the filament length, and it is difficult to measure such a small index change directly. However, the amount of refractive index change can be estimated by fabrication of gratings and measuring their diffraction efficiencies. Based on a Kogelnik's coupled wave theory, the index change can be estimated by $$\Delta n = \frac{\lambda \cos \theta_B}{\pi t} \sin^{-1} \sqrt{\eta} \qquad (4)$$

where $\theta_B$ is the Bragg incident angle, t is the thickness of the grating (filament length) and $\eta$ is the first order diffraction efficiency. Phase gratings inside fused silica were fabricated using the same conditions as with the volume zone plates. The diffraction efficiencies of gratings were measured at the He—Ne laser wavelength (632.8 nm). The estimation of the refractive index increases were $0.16 \times 10^{-3}$ for the laser processing conditions used for fabricating low NA volume zone plates and $1.8 \times 10^{-3}$ for the laser processing conditions used for fabricating high NA volume zone plates.

A. Low NA Volume Zone Plates

Phase-type volume Fresnel zone plates with focal length of 20 mm (NA=0.04) were fabricated, each layer of Fresnel zone plate having 20 zones. It was found from characterizing a single layer phase zone plate that the pulse energy of 10-15 μJ and 10 μm/s laser scanning speed were the optimum conditions for generating a phase zone plate when using 5× objective lens (NA=0.15). At 0.5 mm below the surface, the change of the index of refraction caused by each pulse was elongated over a length which is determined by the Rayleigh range, resulting in a 120 μm-long filament of refractive index change. The filament lengths were predetermined for the specific pulse energies and depths of fabrication from the silica surface. Single layer zone plates were fabricated using central rings instead of "full zones" as discussed previously to reduce the fabrication time. The width of each ring depended on laser writing conditions: focusing lens and depth of fabrication. Using a 5× objective lens, the linewidth of the refractive index change was about 5 μM. With this approach, the fabrication time of a modified phase zone plate was 40 min.

According to the estimation of index increase, the phase shift of He—Ne laser passing through a single layer zone plate was $0.08\pi$. Thus, the combination of refractive index change and the filament length of single layer zone plate were not enough to achieve a $\pi$ phase shift, which is required for a phase reversal zone plate to achieve high diffraction efficiency. Further increase in phase shift can be obtained by either increasing the refractive index change or extending the filament length. Here, the volume zone plate method is advantageous as an alternative to increase the diffraction efficiency.

The volume zone plates were fabricated layer by layer starting with the deepest layer from the surface facing the laser. Each layer was carefully placed according to the design equations to assure that all the layers would couple light together at the focus with constructive interference. The deeper layers were fabricated with less energy to maintain constant thickness of each zone plate. The separation distance between the layers was approximately 200 μm, namely, about twice the thickness of each zone plate, and the zone plate closest to the surface was fabricated at 500 μm beneath the silica surface. The low NA volume zone plates containing up to 10 layers of Fresnel zone plates were fabricated to determine their focusing performance.

B. High NA Volume Zone Plates

High NA volume zone plates were fabricated which can diffract light at a large converging angle at a short focal length. A Fresnel zone plate with high NA offers high resolution focal spot, and it has potentials in various optical applications. For such a short focal length zone plate, the Fresnel zones (rings) are densely spaced, and therefore high resolution fabrication is needed. The closest separation distance between the adjacent zones becomes smaller as the diameter of the zone plate increases according to Eq. (1). Theoretically, the resolution of a high NA Fresnel zone plate is determined by the smallest zone width that can be produced by the fabrication method. The resolution limit is given by $d=0.61\lambda/NA \square 1.22\Delta r_N$ where $\Delta r_N$ is the zone width of the outermost zones. In addition, aberrations such as spherical aberration become noticeable with the high NA Fresnel zone plate when the number of zones (transparent and opaque) are larger than $N=\sqrt{2f/\lambda}$. Therefore, the high NA zone plates could be affected by spherical aberration.

The fabrication parameters were determined experimentally to achieve the smallest linewidth of refractive index change inside fused silica. This linewidth determined the limit in fabrication resolution. The linewidth of about 1 μm could be produced using a 100× objective lens (NA=0.80), a laser scanning speed of 10 μm/s and a pulse energy of 0.1 μJ. First, single layer Fresnel zone plates were fabricated having NA ranging from 0.66 to 0.91 and a focal length of 30-100 μm. The designs of all the high NA zone plates were limited by 1 μm minimum zone separation distance at the outermost zones. Similar to the low NA case, the zone plates were fabricated with central-ring zones instead of full zones. Central zones are more important in this case to minimize phase errors because the zones are much narrower in high NA zone plate, and writing a full zone with an exact width can be difficult. Central-ring high NA zone plates contained 50-90 rings depending on their designed NA. The fabrication time for each high NA zone plate was 40-60 minutes.

For high NA volume zone plate, the spacing between layers had to be as close as possible because small change in focal length causes NA number to decrease significantly. The NA number of volume zone plate was defined by using the longest focal length of the generated zone plates. Volume zone plates with NA=0.8 were fabricated up to five layers to observe an increase in diffraction efficiency.

C. Results for Low NA Volume Zone Plates

The fabricated volume Fresnel zone plates were tested for their diffraction efficiencies using a He—Ne laser at a wavelength of 632.8 nm, according to the method described previously. The single layer phase zone plates had an efficiency of 5.3%. As expected, this low efficiency was due to the small change of the index of refraction which was insufficient to induce a $\pi$ phase shift. By adding more layers to build a volume phase zone plate, the highest efficiency of a volume zone plate with central rings was improved to 71.5% with eight layers of phase zone plates. This efficiency is higher than the result otherwise obtained with the same number of layers because of a better control of filament length and index increase. FIG. 5 shows the measured efficiencies of volume Fresnel zone plates as a function of the number of layers of zone plates. This result implied that the volume method was more effective than simply stacking the zone plates to achieve the $\pi$ phase shift because the efficiency exceeded the maximum possible of 40% by a phase-reversal zone plate. The increase in diffraction efficiency of volume zone plate can be explained in terms of coherent addition of light from different zone plates. For example, the intensity due to two zone plates can be written as $I=I_1+I_2+2\sqrt{I_1 I_2} \cos \delta$ where $\delta$ is the phase shift between the two. In the present case, zero phase shift was specified so that diffracted intensity is as large as possible. However, the diffraction efficiency could not be simply predicted by only coherent addition of beams because there are other effects involved such as multiple diffractions from one layer to the next layers, which required a rigorous analysis.

Figure 6:
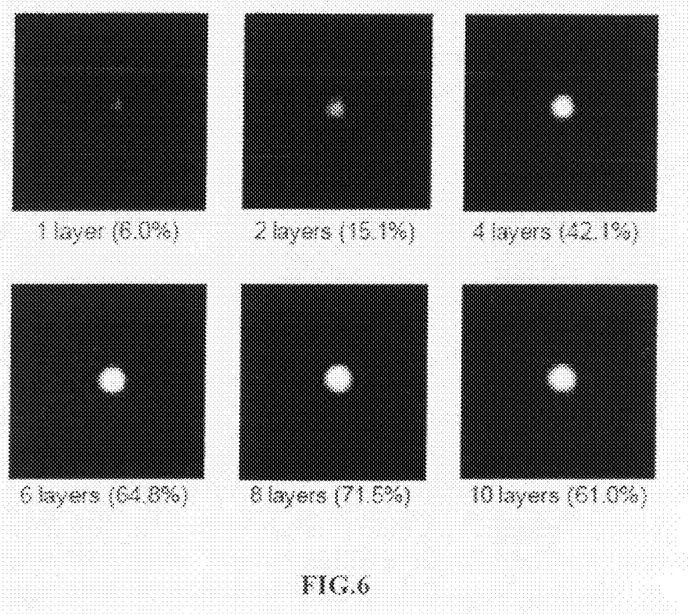
FIG. 6 shows focal spots of Low NA volume phase zone plates with central rings.

The images at the focal spots of the low NA volume zone plates are shown in FIG. 6. The spot size was minimally affected by aberrations, and the focal spot produced by the eight layer phase volume zone plate was about 20 μm, which agreed with the theoretical value of 19.3 μm. The volume phase zone plates had a significant increase in diffraction efficiency when having eight layers. However, 10 layers or more of zone plates started to show a decrease in efficiency. This decrease can be explained by three possible reasons: (1) interaction of light passing through many layers causes phase and focal position error at the focal point, (2) light absorption or scattering becomes noticeable with many phase layers, and (3) accumulated fabrication errors.

D. Results for High NA Volume Zone Plates

Figure 7:
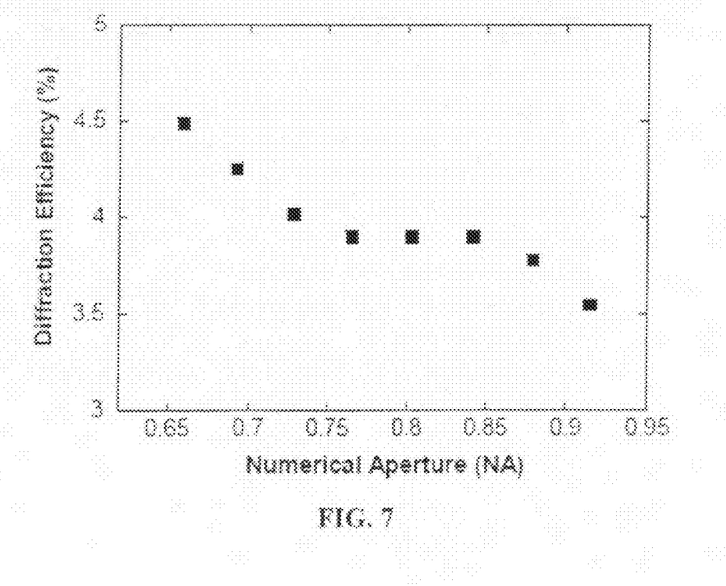
FIG. 7 is a plot of diffraction efficiency of a single layer zone plate (NA=0.66–0.91).

For the high NA zone plate, the diffraction efficiency is low, which causes relatively large measurement uncertainties. The results of single layer high NA zone plates are shown in FIG. 7, together with the estimated measurement uncertainties. For single layer zone plate of NA=0.66–0.91, the diffraction efficiency trended to be slightly higher for a lower NA zone plate. The possible reason is that the higher NA zone plates were partially overlapped at the outer zones, resulting in more phase shift error. The single layer high NA zone plates had efficiencies of 4.5% to 3.5% for NA from 0.66 to 0.91. The lower diffraction efficiency as compared to a low NA volume zone plate is mainly due to the much shorter filament length produced by a high NA objective Lens.

Figure 8:
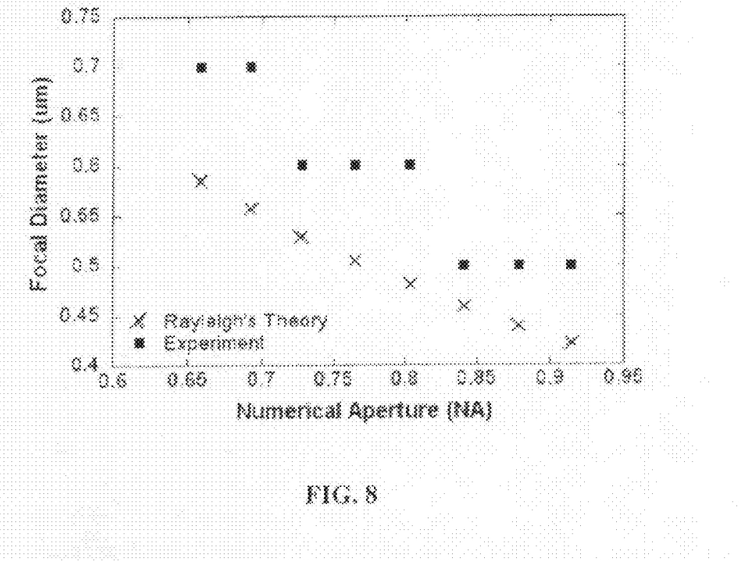
FIG. 8 is a plot of experimental spatial resolutions compared with the Rayleigh criterion of single layer high NA zone plates.
Figure 9:
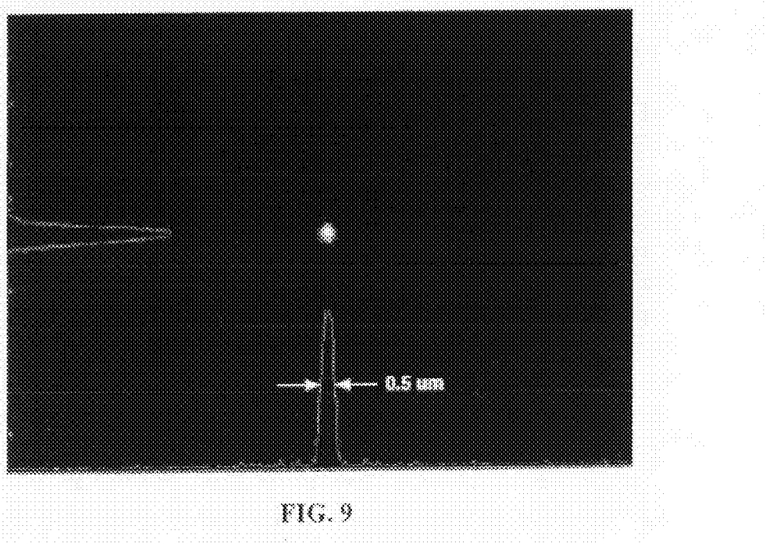
FIG. 9 shows a focal spot of a high NA zone plate (NA=0.9, f=30 um).

In the study of high NA zone plates, it is especially of interest to reduce the focal spot size or improve the spatial resolution of the zone plate since these fabricated zone plates are often intended for high resolution applications. The single layer high NA zone plates could produce a spot as small as 0.9 μm for zone plate with NA=0.91. FIG. 8 compares the experimental resolution of high NA zone plates with the Rayleigh criterion. The focal spots of the zone plates were larger than the predicted values, possibly because of aberrations and overlapped zones. The overlapped zones reduced the effective diameter of the zone plate and lowered the effective NA. On the other hand, the spot size for high NA zone plate still showed good Gaussian profile as shown in FIG. 9.

Figure 10:
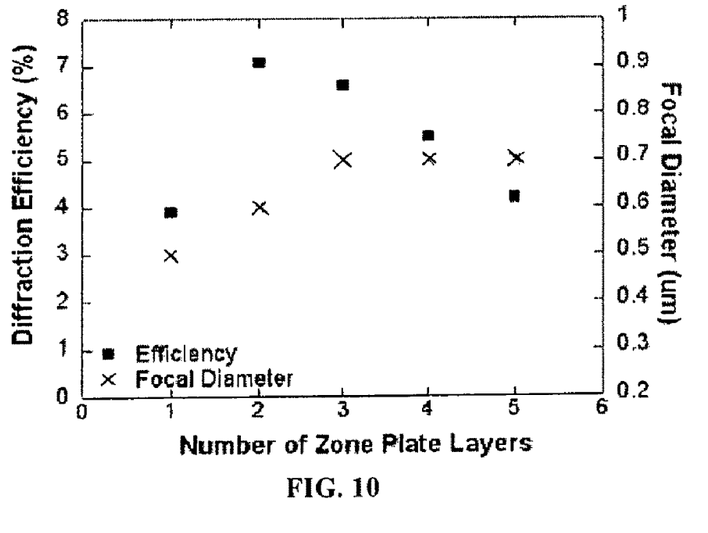
FIG. 10 is a plot of diffraction efficiencies and focal diameters of high NA volume zone plates (NA=0.8).

The diffraction efficiencies and the corresponding focal spot sizes of volume zone plates with NA=0.80 having up to five layers are shown in FIG. 10. The maximum efficiency of 7.1% was obtained with a two-layer zone plate, and the focal spot size increased with the number of layers. With two layers, the diffraction efficiency was maximized while the total phase shift was only $0.06\pi$. This phase shift could be increased with more layers but there were other factors that diminished efficiency as the number of layers increased.

While the invention has been illustrated and described in detail in the drawings and foregoing description, the same is to be considered as illustrative and not restrictive in character, it being understood that only preferred embodiments have been shown and described and that all changes and modifications that come within the spirit of the invention are desired to be protected. Volume modified phase and amplitude Fresnel zone plates according to embodiments of the present invention are fabricated inside fused silica by femtosecond laser direct writing. These multilayer zone plates constructively focus light at the focal point, and increase the diffraction efficiency significantly. Both low NA and high NA volume Fresnel zone plates may be fabricated inside a bulk of fused silica by femtosecond laser direct writing. In addition, a new technique for modified Fresnel zone plates in which only the central ring of each zone is irradiated by the laser has the advantage of greatly reducing fabrication time and phase errors.

We claim:

1. A method of producing a volume Fresnel zone plate in a solid transparent material, comprising:
    focusing a pulsed laser beam onto each of a set of points at a first depth within said solid transparent material so as to create a first Fresnel zone plate; and
    focusing said pulsed laser beam onto each of a set of points at a second depth within said solid transparent material so as to create a second Fresnel zone plate,
    wherein said first and second Fresnel zone plates are optically aligned with each other and include respective zones of different radii corresponding to different optical path lengths to a desired common focal point;
    wherein said first and second Fresnel zone plates are fabricated using femtosecond laser direct writing; and
    wherein said second Fresnel zone plate is at a greater depth than said first Fresnel zone plate and is created with less laser energy to maintain constant thickness of each zone plate.

2. The method of claim 1, wherein each of said Fresnel zone plates is on the order of 100 μm thick and its separation distance from the other Fresnel zone plate is approximately twice its thickness.

3. The method of claim 2, wherein said first Fresnel zone plate is on the order of 500 μm beneath the surface of said solid transparent material.

4. A volume modified Fresnel zone plate, comprising:
    a solid transparent substrate with a substantially uniform base index of refraction;
    a plurality of substantially parallel central-ring zone plates formed in said substrate, said zone plates each having a plurality of concentric rings with a refractive index different than said base index of refraction, said rings formed so as to produce substantially matched focusing at a desired focal point, said rings having substantially equal width but unequal radial spacing in each zone plate, the spacing between rings decreasing progressively with radius.

5. The volume modified Fresnel zone plate of claim 4, wherein each ring has the width of a laser scanning line produced by a tightly focused femto second laser, and wherein each central-ring zone plate has low diffraction efficiency but works coherently with the other central-ring zone plates to improve the overall diffraction efficiency.

6. The volume modified Fresnel zone plate of claim 5, wherein the width of each ring is less than approximately 5 μm.

7. The volume modified Fresnel zone plate of claim 6, wherein the width of each ring is approximately 2 μm.

8. The volume Fresnel zone plate of claim 7, wherein each of said central-ring zone plates is on the order of 100 μm thick and its separation distance from adjacent zone plates is approximately twice its thickness.

9. The volume Fresnel zone plate of claim 8, wherein a shallower one of said central-ring zone plates is on the order of 500 μm beneath the surface of said solid transparent substrate.

10. The volume modified Fresnel zone plate of claim 4, wherein said plurality of central-ring zone plates includes spaced first and second zone plates having first and second sets of substantially circular rings of radius $r_1$ and $r_2$, respectively, and wherein the radius $r_2$ of a given ring in said second zone plate is a function of the radius $r_1$ of a corresponding ring in said first zone plate and of the spacing between said first and second zone plates.

11. The volume modified Fresnel zone plate of claim 10,
wherein said focal point is in a medium "a" with refractive index $n_a$ outside of said substrate and said substrate comprises a medium "b" with a refractive index $n_b$;
wherein the relationship between $r_1$ and $r_2$ is defined by $$\phi_1 = \phi_{a,1} + \phi_{b,1} = \frac{2\pi}{\lambda}(n_{a,1}t_{a,1} + n_{b,1}t_{b,1}) = \frac{2\pi}{\lambda}m_1 + b_1 \quad (1)$$

$$\phi_2 = \phi_{a,2} + \phi_{b,2} = \frac{2\pi}{\lambda}(n_{a,2}t_{a,2} + n_{b,2}t_{b,2}) = \frac{2\pi}{\lambda}m_2 + b_2 \quad (2)$$

where
$\phi_1$=phase change from first zone plate to focal point
$\phi_2$=phase change from second zone plate to focal point
$\lambda$=wavelength
f=focal length
t=optical path length due to wave propagation
m=a whole number of wavelengths
b=phase remainder
and wherein a value of $r_1$ is determined for a given ring in said first zone plate, the phase remainder $b_1$ in Eq. (1) is calculated based on $r_1$, said focal point and a given wavelength, and, in accordance with Eq. (2), a value is determined for the radius $r_2$ of a corresponding ring in said second zone plate which produces a phase remainder $b_2$ which substantially equals $b_1$.

12. The volume modified Fresnel zone plate of claim 11,
wherein an initial value of $r_1$ is determined for each ring in said first zone plate based on a given wavelength and the distance to said focal point so as to produce substantially matched focusing at said focal point, and an initial value of $r_2$ is likewise determined for each ring in said second zone plate; and
wherein $r_2$ is adjusted from its initial value in accordance with said relationship between $r_1$ and $r_2$ defined in claim 11.

13. The volume modified Fresnel zone plate of claim 11, wherein medium "b" is glass.

14. A method of producing a volume Fresnel zone plate in a solid transparent material, comprising:
focusing a pulsed laser beam onto each of a set of points at a first depth within said solid transparent material so as to create a first Fresnel zone plate; and
focusing said pulsed laser beam onto each of a set of points at a second depth within said solid transparent material so as to create a second Fresnel zone plate,
wherein said first and second Fresnel zone plates are optically aligned with each other and include respective zones of different radii corresponding to different optical path lengths to a desired common focal point; and
wherein said first and second Fresnel zone plates are central-ring zone plates having first and second sets of substantially circular rings of radius $r_1$ and $r_2$, respectively, and wherein the radius $r_2$ of a given ring in said second zone plate is a function of the radius $r_1$ of a corresponding ring in said first zone plate and of the spacing between said first and second zone plates.

15. The method of claim 14,
wherein said focal point is in a medium "a" with refractive index $n_a$ outside of said solid transparent material and said solid transparent material comprises a medium "b" with a refractive index $n_b$;
wherein the relationship between $r_1$ and $r_2$ is defined by $$\phi_1 = \phi_{a,1} + \phi_{b,1} = \frac{2\pi}{\lambda}(n_{a,1}t_{a,1} + n_{b,1}t_{b,1}) = \frac{2\pi}{\lambda}m_1 + b_1 \quad (1)$$

$$\phi_2 = \phi_{a,2} + \phi_{b,2} = \frac{2\pi}{\lambda}(n_{a,2}t_{a,2} + n_{b,2}t_{b,2}) = \frac{2\pi}{\lambda}m_2 + b_2 \quad (2)$$

where
$\phi_1$=phase change from first zone plate to focal point
$\phi_2$=phase change from second zone plate to focal point
$\lambda$=wavelength
f=focal length
t=optical path length due to wave propagation
m=a whole number of wavelengths
b=phase remainder
and wherein a value of $r_1$ is determined for a given ring in said first zone plate, the phase remainder $b_1$ in Eq. (1) is calculated based on $r_1$, said focal point and a given wavelength, and, in accordance with Eq. (2), a value is determined for the radius $r_2$ of a corresponding ring in said second zone plate which produces a phase remainder $b_2$ which substantially equals $b_1$.

16. The method of claim 15,
wherein an initial value of $r_1$ is determined for each ring in said first zone plate based on a given wavelength and the distance to said focal point so as to produce substantially matched focusing at said focal point, and an initial value of $r_2$ is likewise determined for each ring in said second zone plate; and
wherein $r_2$ is adjusted from its initial value in accordance with said relationship between $r_1$ and $r_2$ defined in claim 15.

17. The method of claim 16, wherein $r_2$ is adjusted iteratively.

* * * * *